(12) United States Patent
Laksberg et al.

(10) Patent No.: US 8,695,003 B2
(45) Date of Patent: Apr. 8, 2014

(54) METHOD FOR MANAGING DATA ACCESSIBILITY BY SCHEDULING THREE TYPES OF EXECUTABLE AGENTS ASSOCIATED WITH PRE-DEFINED ACCESS RIGHTS WITHIN A DOMAIN

(75) Inventors: Artur Laksberg, Redmond, WA (US); Joshua D. Phillips, Seattle, WA (US); Niklas Gustafsson, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1135 days.

(21) Appl. No.: 12/649,255

(22) Filed: Dec. 29, 2009

(65) Prior Publication Data

US 2011/0161604 A1  Jun. 30, 2011

(51) Int. Cl.
*G06F 9/46* (2006.01)

(52) U.S. Cl.
USPC ............................................. 718/102; 711/153

(58) Field of Classification Search
USPC .................................. 718/102; 711/100, 153
See application file for complete search history.

(56) References Cited

U.S. PATENT DOCUMENTS

| 5,175,851 | A | 12/1992 | Johnson et al. |
| 5,375,215 | A | 12/1994 | Hanawa et al. |
| 5,454,108 | A | 9/1995 | Devarakonda et al. |
| 5,459,871 | A | 10/1995 | Van Den Berg |
| 5,682,537 | A | 10/1997 | Davies et al. |
| 6,009,269 | A | 12/1999 | Burrows et al. |
| 6,092,156 | A | 7/2000 | Schibinger et al. |
| 6,601,120 | B1 | 7/2003 | Schimmel |
| 6,817,009 | B2 | 11/2004 | Flanagan et al. |
| 7,165,150 | B2 | 1/2007 | Alverson et al. |
| 7,188,344 | B1 | 3/2007 | Blue |
| 7,284,271 | B2 * | 10/2007 | Lucovsky et al. ............... 726/21 |
| 7,316,005 | B2 | 1/2008 | Qadeer et al. |
| 7,469,403 | B2 | 12/2008 | Choi et al. |
| 8,316,369 | B2 | 11/2012 | Laksberg et al. |
| 2004/0205392 | A1 | 10/2004 | Wu |
| 2008/0077922 | A1 | 3/2008 | Doring |
| 2008/0209433 | A1 | 8/2008 | McKenny |

(Continued)

FOREIGN PATENT DOCUMENTS

WO  WO2005043388 A1  5/2005

OTHER PUBLICATIONS

Thought Exercise: Axum + F#: Isolation, Agents, and Message-passing in .NET—Published Date: Mar. 31, 2009 http://blogs.msdn.com/maestroteam/ (26 pages).

(Continued)

*Primary Examiner* — Thomas Lee
*Assistant Examiner* — Xuxing Chen
(74) *Attorney, Agent, or Firm* — Brian Haslam; Kevin Sullivan; Micky Minhas

(57) ABSTRACT

Multiple types of executable agents operating within a domain. The domain includes mutable shared state and immutable shared state, with agents internal to the domain only operating on the shared state. Writer agents are defined to be agents that have read access and write access to mutable shared state and read access only to immutable shared state. General reader agents have read access to both mutable shared state and immutable shared state and have no write access. Immutable reader agents have read access to only immutable shared state and have no write access. By appropriate scheduling of the different types of agents, data races may be reduced or eliminated.

20 Claims, 3 Drawing Sheets

(56) References Cited

U.S. PATENT DOCUMENTS

| | | |
|---|---|---|
| 2009/0193417 A1 | 7/2009 | Kahlon |
| 2009/0328047 A1 | 12/2009 | Li et al. |
| 2011/0161610 A1 | 6/2011 | Gustafsson et al. |
| 2011/0161962 A1 | 6/2011 | Laksberg et al. |

OTHER PUBLICATIONS

Stork et al., Concurrency by Default Using Permissions to Express Dataflow in Stateful Programs—Published Date: Oct. 25-29, 2009 http://www.cs.cmu.edu/~aldrich/papers/onward2009-concurrency.pdf (8 pages).
Isolation in Maestro: Isolation, Agents, and Message-passing in .NET—Published Date: 2009 http://blogs.msdn.com/maestroteam/archive/2009/02/27/isolation-in-maestro.aspx (7 pages).
Axum, Microsoft's Approach to Parallelism—Published Date: Apr. 23, 2009 http://www.infoq.com/news/2009/04/Axum (2 pages).
Greenhouse et al, Assuring and Evolving Concurrent Programs: Annotations and Policy—Published Date: May 19-25, 2002http://fluid.cs.cmu.edu:8080/Fluid/fluid-publications/p453-greenhouse.pdf (11 pages).
Taming Your Sequence's Side-Effects through IEnumerable.Let—Published Date: Sep. 12, 2009 http://bartdesmet.net/blogs/bart/archive/2009/09/12/taming-your-sequence-s-side-effects-through-ienumerable-let.aspx (20 pages).
Kieburtz, Taming Effects with Monadic Typing1—Published Date: 1998 http://delively.acm.org/10.1145/290000/289428/p51-kieburtz.pdf?key1=289428&key2=9659755521&coll=GUIDE&dl=GUIDE&CFID=56555689&CFTOKEN=92779120 (12 pages).
Andrade et al., Software Synthesis from Dataflow Models for G and LabVIEW—Published Date Mar. 16, 1998 http://users.ece.utexas.edu/~bevans/courses/ee382c/projects/spring98/andrade-kovner/litsurvey.pdf (9 pages).
Ha et al., Compile-Time Scheduling of Dynamic Constructs in Dataflow Program Graphs, IEEE Transactions of Computers, vol. 46, No. 7, Published Date: Jul. 1997 http://ptolemy.eecs.berkeley.edu/publications/papers/97/compile/compile.pdf (12 pages).
Munnich, PRED-DF—A Data Flow Based Semantic Concurrency Control Protocol for Real-Time Main-Memory Database Systems—Published Date: 2000 http://ieeexplore.ieee.org/stamp/stamp.jsp?tp=&arnumber=896428&isnumber=19358 (5 pages).
Cox et al., Adding Parallelism to Visual Data Flow Programs—Published Date—2005 http://users.cs.dal.ca/~arc/publications/2-36/paper.pdf (10 pages).
Templ et al., Lock-Free Synchronization of Data Flow between Time-Triggered and Event-Triggered Activities in a Dependable Real-Time System—Retrieved Date: Oct. 14, 2009 http://embeddedcmmi.at/fileadmin/src/docs/publications/C088.pdf (6 pages).
Leung et al., Data Race: Tame the Beast,—Published Date: 2009 http://www.cs.otago.ac.nz/research/publications/oucs-2009-01.pdf (11 pages).
Nienaltowski, Efficient Data Race and Deadlock Prevention in Concurrent Object-Oriented Programs—Published Date: 2004 http://se.inf.ethz.ch/people/nienaltowski/papers/oopsla04.pdf (2 pages).
Office Action dated Apr. 10, 2012 cited in U.S. Appl. No. 12/649,254.
Notice of Allowance dated Aug. 8, 2012 cited in U.S. Appl. No. 12/649,254.
Office Action dated Mar. 4, 2013 cited in U.S. Appl. No. 12/649,252.
Notice of Allowance dated Jun. 24, 2013 cited in U.S. Appl. No. 12/649,252.

* cited by examiner

METHOD FOR MANAGING DATA ACCESSIBILITY BY SCHEDULING THREE TYPES OF EXECUTABLE AGENTS ASSOCIATED WITH PRE-DEFINED ACCESS RIGHTS WITHIN A DOMAIN

BACKGROUND

Computing systems obtain a high degree of functionality by executing software programs. Programs consist of computer-executable instructions that are kept in some persistent form, such as on a harddrive, a compact disk, a thumbdrive, flash memory, or the like. During execution, such computer-executable instructions may often be loaded in volatile memory, and executed by one or more processors of the computing system, causing the computing system to perform tasks.

Computing systems that have multiple processors or multiple processor cores often partition the program into multiple concurrently executing tasks. Such concurrent execution can improve responsiveness and processing efficiency, but concurrent execution can result in different tasks trying to access the same data (known as "shared state") in the computing system.

However, unrestricted access to shared state can lead to problems that are hard to detect, reproduce and solve. Among these problems are data races. A data race is a situation where a task can observe an invalid state of an object in memory, while another task is at the same time mutating the state of that object. Exploiting the benefits of concurrency while avoiding data races has historically been a hard problem to solve.

BRIEF SUMMARY

At least one embodiment described herein relates to the use of multiple types of executable agents operating within a domain. The domain includes mutable shared state and immutable shared state, with agents internal to the domain only operating on the shared state. Writer agents are defined to be agents that have read access and write access to mutable shared state and only read access to immutable shared state. General reader agents have read access to both mutable shared state and immutable shared state and have no write access. Immutable reader agents have read access to only immutable shared state and have no write access.

In one embodiment, a scheduler is configured to reduce or eliminate data races by scheduling the writer agents, the general reader agents, and the immutable reader agents. For any given portion of the mutable state, the scheduler ensures that for any given portion of the mutable shared state, at most one writer agent is accessing the given portion at any given time. The scheduler further does not allow any reader agents to access the given portion of the mutable shared state if a writer agent is accessing the given portion of the mutable shared state, and allows one or more reader agents to access the given portion of the mutable shared state if a writer agent is not accessing the given portion of the shared state. Furthermore, the scheduler allows any of the agents to read the immutable shared state independent of any access restrictions to the mutable shared state.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, multiple types of executable agents operating within a domain. The domain includes mutable shared state and immutable shared state, with agents internal to the domain only operating on the shared state. Writer agents are defined to be agents that have read access and write access to mutable shared state and read access only to immutable shared state. General reader agents have read access to both mutable shared state and immutable shared state and have no write access. Immutable reader agents have read access to only immutable shared state and have no write access. Such "immutable reader" agents are so termed only because they read immutable data, and does not imply anything regarding whether the agent itself is immutable. By appropriate scheduling of the different types of agents, data races are eliminated. First, some introductory discussion regarding computing systems will be described with respect to FIG. 1. Then, various embodiments of the use and scheduling of the agents within the domain will be described with reference to FIGS. 2 and 3.

Figure 1:
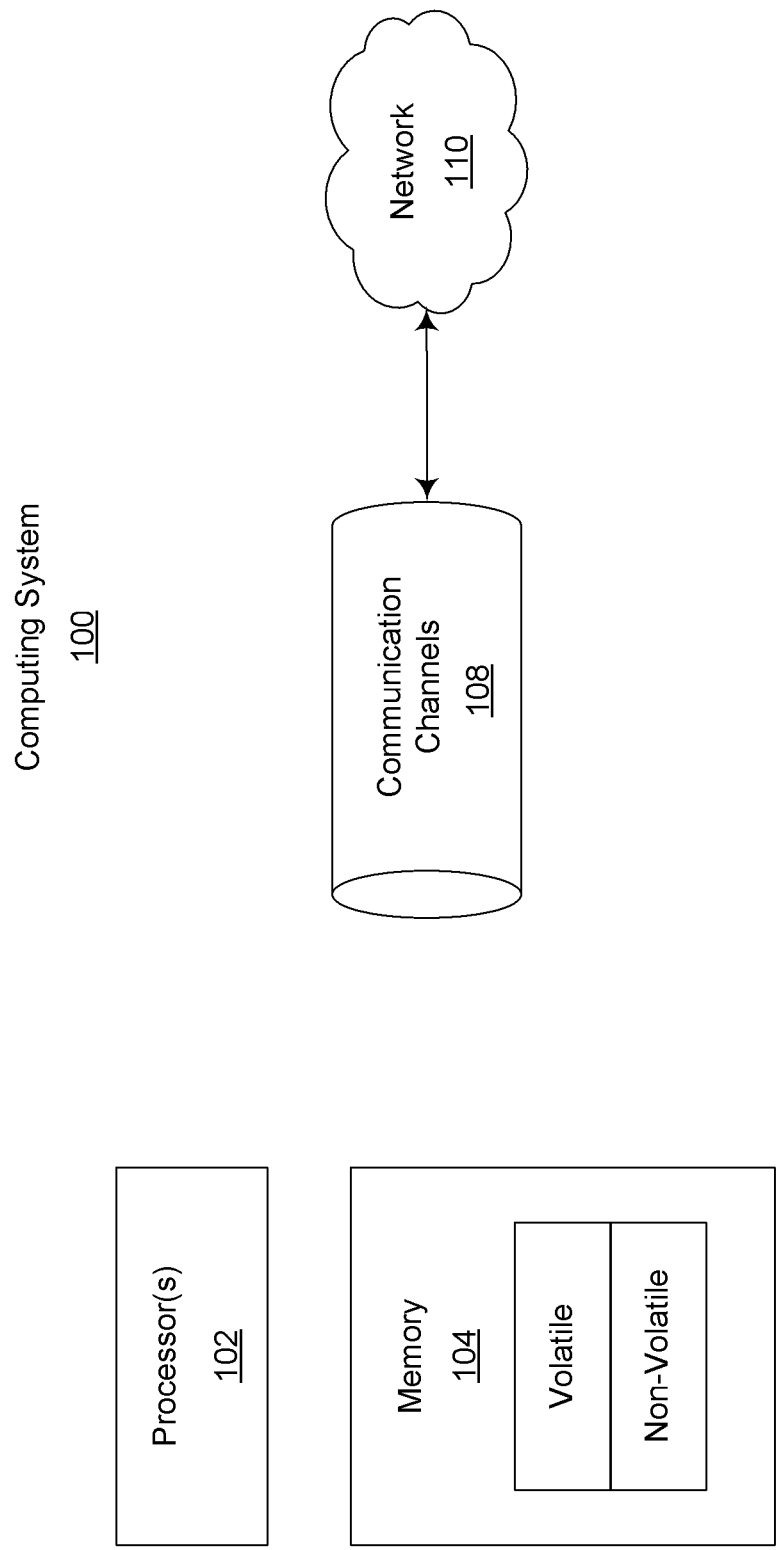
FIG. 1 illustrates an example computing system that may be used to employ embodiments described herein.

First, introductory discussion regarding computing systems is described with respect to FIG. 1. Computing systems are now increasingly taking a wide variety of forms. Computing systems may, for example, be handheld devices, appliances, laptop computers, desktop computers, mainframes, distributed computing systems, or even devices that have not conventionally considered a computing system. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100.

Computing system 100 may also contain communication channels 108 that allow the computing system 100 to communicate with other message processors over, for example, network 110. Communication channels 108 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

Embodiments within the scope of the present invention also include a computer program product having computer-readable media for carrying or having computer-executable instructions or data structures stored thereon. Such computer-readable media (or machine-readable media) can be any available media that can be accessed by a general purpose or special purpose computer. By way of example, and not limitation, such computer-readable media can comprise physical storage and/or memory media such as RAM, ROM, EEPROM, CD-ROM, DVD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Figure 2:
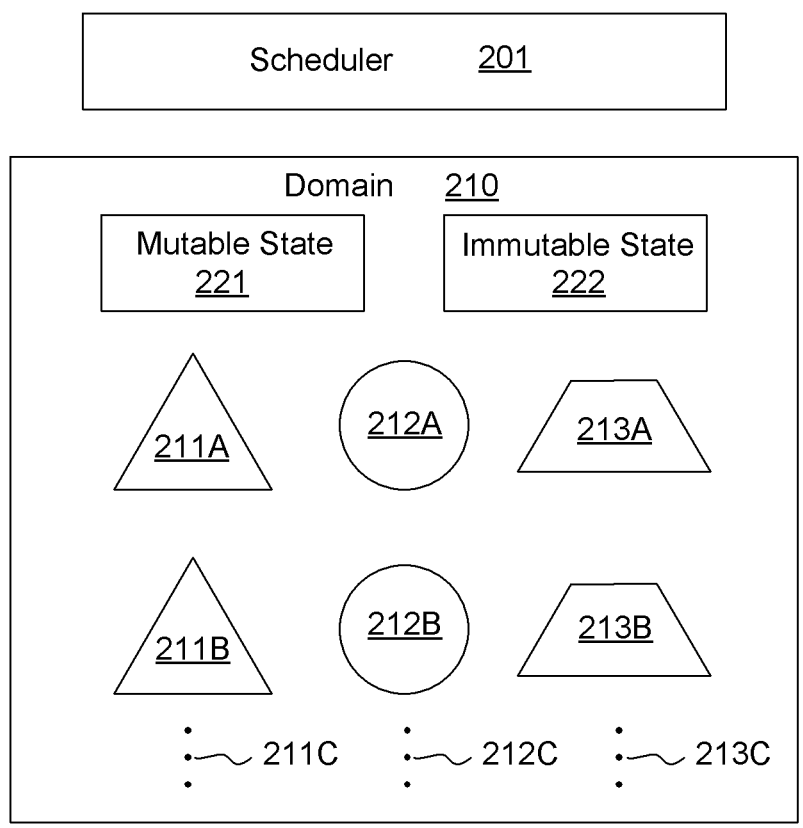
FIG. 2 abstractly illustrates an execution environment that includes a scheduler that schedules execution of various agents within a domain.

FIG. 2 illustrates an environment 200 that includes a scheduler 201 and a domain 210. The scheduler 201 may be, for example, an in-memory component that is instantiated in response to the execution of one or more computer-executable instructions of a computer program product. The creation of the domain 210 and its various constituent agents 211 through 217 may also be performed in response to the execution of such one or more computer-executable instructions. The operation and potential termination of the scheduler 201, the domain 210, and the constituent agents 211 through 217 may also be performed in response to the execution of such one or more computer-executable instructions.

The domain 210 includes mutable shared state 221 and immutable shared state 222. The mutable shared state 221 is state that may be altered (or mutated) by at least one of the agents that are defined in the domain 210. The immutable shared state 222 is state that may not be altered (i.e., is immutable) by any of the agents that are defined in the domain 210. In one embodiment, although not required, the immutable state 222 may be initialized upon creation of the domain 210.

The domain 210 is illustrated as having three different types of agents, referred to herein as writer agents, general reader agents (sometimes referred to as "reader agents"), and immutable reader agents (sometimes referred to as "no-access agents"). Each of the different types of agents is represented in FIG. 2 as having a different form. For instance, writer agents 211A and 211B are symbolized as triangles, general reader agents 212A and 212B are symbolized as circles, and immutable reader agents 213A and 213B are symbolized as trapezoids.

Although two of each type of agent are illustrated, the ellipses 211C, 212C and 213C illustrated that there may be any number of such agents. For instance, there may even be one or three of more of any of such agents. Furthermore, during execution, there may not always be at least one of each type of agent. For instance, there may be times when there are agents of just one or two of the three agent types running, though the scheduling 201 has the capacity to schedule all three agent types. Although not illustrated, each of the agents, regardless of its type, may have its own internal state that it alone may access freely. In one embodiment, the domains and agents are generated using the Axum programming language, although certainly not required.

Writer agents (such as agents 211A, 211B and 211C) have read access and write access to mutable shared state 221 and have read access to immutable shared state 222. Read access with respect to mutable shared state might include, for example, copying any portion of the mutable shared state into the internal state of the agent (also referred to herein as "agent state") that the agent is free to alter internally. For instance, the agent state might be a local variable of the agent or an instance field of the agent. Similarly, read access with respect to immutable shared state might include copying any portion of the immutable shared state into the internal state of the agent that the agent is free to alter internally. Write access with respect to mutable shared state permits the copying of internal agent state (e.g., a local variable or an instance field) to a particular domain field in the mutable state, or perhaps copying content of mutable or immutable shared state to a domain field of the mutable shared state.

General reader agents (such as agents 212A, 212B and 212C—referred to in the Axum language as "reader agents") have read access to both mutable shared state 221 and immutable shared state 222, and have no write access to any of the shared state 221 or 222. Immutable reader agents (such as agents 213A, 213B and 213C—referred to in the Axum language as "no-access agents") have read access to only immutable shared state 222, and have no write access to any of the shared state 221 or 222. In one embodiment, such as in the Axum programming language, none of the writer agents, general reader agents, or immutable reader agents have any read or write access to any data outside of the domain.

The scheduler 201 is configured to schedule multiple executable agents such as the writer agents, general reader agents, and immutable reader agents. The scheduling is conducted in accordance with a policy. As part of that policy, the scheduler 201 considers the access rights of the agents. While the scheduler 201 may vary from the policy that will now be described, strict adherence to the policy now described permits for the significant reduction or even perhaps elimination of data races. Lesser adherence to the policy, however, may still provide some benefit in terms of reduction in data races.

As for the policy with respect to writer agents, the scheduler 201 ensures that at most one writer agent is accessing a portion of the mutable shared state at any given time. Furthermore, if a writer agent is to access the portion of the mutable shared state, the scheduler prohibits any reader agents from reading that same portion of the shared state. This prevents data races. In one embodiment, if one writer agent is accessing any portion of the mutable shared state, all general reader agents are prohibited from accessing any portion of the mutable shared state, even if they are not trying to access the same mutable shared state.

Even so, immutable reader agents are still permitted to read immutable state regardless of whether there are writer agents having write access to mutable state. Permitting such concurrent read access to immutable reader agents and writer agents does not result in a risk of data races since there is no risk that the immutable state will be changed by the writer agent, the writer agent not having write access to the immutable state. Thus, at least some reader agents (the immutable reader agents) may continue to execute even if there is a writer agent executing, resulting in processing improvements as compared to a policy in which all reader agents are prohibited from executing if a writer agent is executing.

As for the policy with respect to general reader agents, if a writer agent is writing to a particular portion of the mutable shared state, the scheduling prohibits any general reader agent from reading that portion mutable shared state. Once again, in one embodiment, the policy treats the mutable shared state as a whole, such that if the writer agent is accessing any portion of the mutable shared state, the entire mutable shared state is blocked to other general reader agents. If a writer agent is not writing to a portion of the mutable shared states, then the scheduler may schedule one or more general reader agents to access that portion of the mutable shared state. If treating the mutable shared state as a single whole, the scheduler may have one or more general reader agents concurrently executing if there is not a writer agent executing.

As for the policy with respect to immutable reader agents, the immutable reader agents may be permitted read access to any portion of the immutable state. By definition, the reader agents do not read from the mutable shared state. Accordingly, allowing unfettered read access to immutable state does not increase any risk of data races due to the operation of writer agents, general reader agents, or other immutable reader agents.

Stated another way, the policy ensures that for any given portion of the mutable shared state 1) at most one writer agent is accessing the given portion at any given time, 2a) does not allow any reader agents to access the given portion of the mutable shared state if a writer agent is accessing the given portion of the mutable shared state, and 2b) allows one or more reader agents to access the given portion of the mutable shared state if a writer agent is not accessing the given portion of the shared state. With respect to immutable shared state, no agent ever has write access to the immutable shared state, and all agents have read access to the immutable state.

Thus, the scheduler may be a concurrency scheduler that schedules, in some case, multiple agents to be executing concurrently using a scheduling policy that reduces or eliminates the risk of data races.

Figure 3:
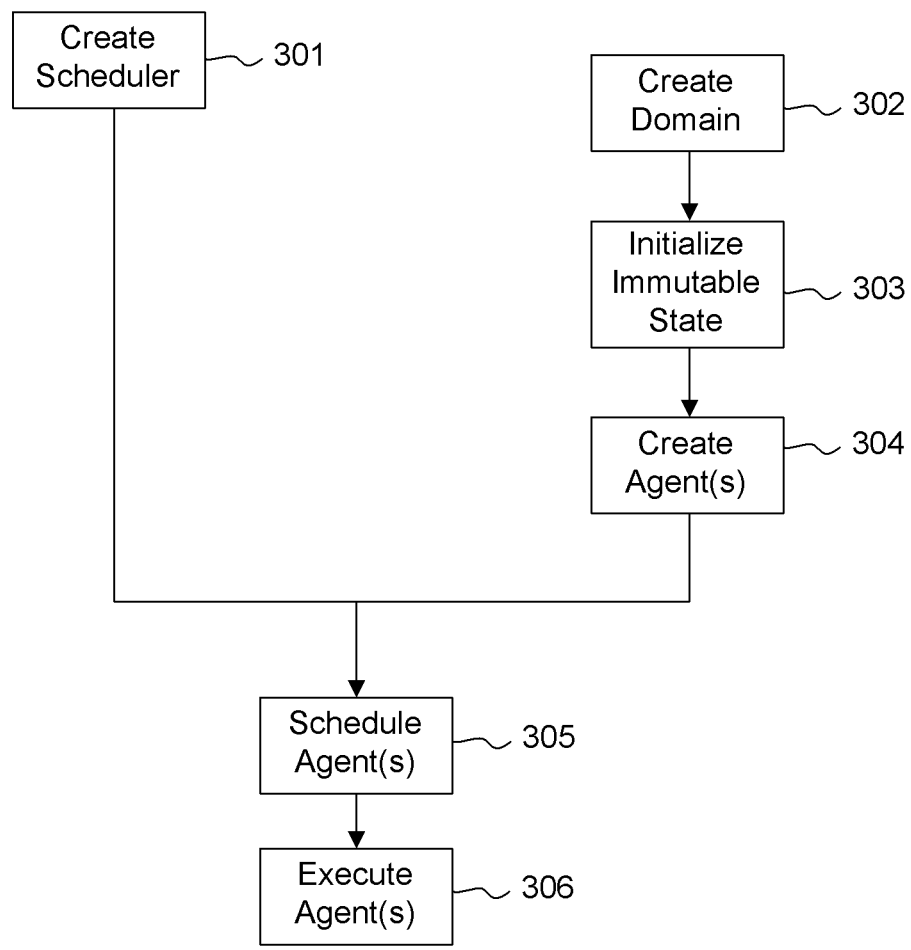
FIG. 3 illustrates a flowchart of a method for scheduling agent execution applied to the environment of FIG. 2.

FIG. 3 illustrates a flowchart of a method 300 for reducing the risk of data races in a computing system. The method 300 may be implemented within, for example, the computing system 100 of FIG. 1. The method 300 creates a scheduler (act 301) (such a scheduler 201 of FIG. 2), and creates a domain (act 302) (such as the domain 210 of FIG. 2). Optionally, upon creation of the domain, the immutable shared state (such as immutable shared state 222 in FIG. 2) is initialized (act 303). As for the mutable shared state, this may be created and edited at some points along the life of the domain. The creation of the domain may be performed in response to computer-executable code.

The domain defines a number of machine-executable agents within the domain, which are created (act 304). For instance, with respect to FIG. 2, the domain 210 defines agents 211A, 211B, 211C, 212A, 212B, 212C, 213A, 213B, and 213C. The scheduler than schedules the agents (act 305) in accordance with a scheduling policy, an example of a portion of which being described above. Other policy considerations might include execution dependencies between agents. For instance, one agent may rely upon the output of execution of another agent. The scheduled agents are executed (act 306) in the order and with the concurrency dictated by the scheduler.

The creation, scheduling, and execution of the agents may be performed continuously, with the scheduling continuously reevaluating the schedule according to policy. Accordingly, as new agents are created, and as execution of old agents completes, the scheduler may allow other agents to execute in accordance with policy.

While the principles described herein are by no means limited to the Axum program language, for the sake of completeness, an example implementation is described with respect to an Axum code example.

```
domain D
{
    int m = 1; // mutable state
    const int i = 2; // immutable state
    writer agent A : channel X
    {
        public A( ) { // agent constructor
        }
        void f( ) {
            // receive expression, execution pauses
            var x = receive(PrimaryChannel::Port);    var y = x; // execution resumes
        }
    }
    reader agent B : channel X
    {
        public B( ) { }
    }
    agent C : channel X
    {
        public C( ) { }
    }
}
```

In this example, the domain is created with one domain field of mutable domain state (referred to as field "m" of type integer and initialized with a value of 1), and one domain field of immutable domain state (referred to as field "i" of type integer and initialized with a value of 2). The immutable state is designated in the source code using the "const" designator, whereas the mutable state lacks this designator. The construction and execution of three agents A, B, and C are also shown in the code example, with agent A being a writer agent, with agent B being a general reader agent (for example, a "reader agent" in Axum), and with agent C being an immutable reader agent (for example, a "no access agent" in Axum). Agent A is designated as a writer agent using the term "writer agent" in the code example. Agent B is designated as a general reader agent using the term "reader agent" in the code example. Agent C is designed as an immutable reader agent using the term "agent" with no modifiers in the code example.

A compiler may verify how the agent is typed in the source code, and determine whether the actions taken (as identifiable by the source code), constitute an appropriate action. Accordingly, the principles described herein provide an effective mechanism to reduce data races, while allowing a high degree of concurrency.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising one or more physical computer-readable hardware storage devices having thereon computer-executable instructions that, when executed by one or more processors of the computing system, cause the computing system to instantiate a scheduler that is configured to schedule at least three different types of executable agents within a domain in which there is mutable shared state and immutable shared state, the at least three different types of executable agents including writer agents, general reader agents, and immutable reader agents,
   wherein the writer agents have read access and write access to the mutable shared state and read access to the immutable shared state;
   wherein the general reader agents have read access to both the mutable shared state and the immutable shared state;
   wherein the immutable reader agents have read access to only the immutable shared state, such that immutable reader agents are unable to access the mutable shared state; and
   wherein the scheduler implements global access rights for the mutable shared state, such that the scheduler prevents any of the general reader agents from accessing any particular portion of the mutable shared state, even when that particular portion of the mutable shared state is not being accessed by any writer agent, wherein said any writer agent is accessing another portion of the mutable shared state.

2. The computer program product in accordance with claim 1, wherein the scheduler is configured to perform the following:
   ensuring that at most one writer agent is accessing a portion of the mutable shared state at any given time; and
   ensuring that if a writer agent is accessing the portion of the mutable shared state, that no general reader agents are also accessing the portion of the mutable shared state.

3. The computer program product in accordance with claim 2, wherein the scheduler is also configured to perform the following:
   allowing one or more general reader agents access to the portion of the mutable shared state if there are no writer agents also accessing the portion of the mutable shared state.

4. The computer program product in accordance with claim 3, wherein the scheduling is also configured to perform the following:
   allowing one or more immutable reader agents access to the immutable shared state regardless of whether there is a writer agent or one or more reader agents also accessing the immutable shared state.

5. The computer program product in accordance with claim 1, wherein the scheduler is configured to perform the following:
   allowing one or more general reader agents access to a portion of the mutable shared state if there are no writer agents also accessing the portion of the mutable shared state.

6. The computer program product in accordance with claim 5, wherein the scheduling is configured to perform the following:
   allowing one or more immutable reader agents access to the immutable shared state regardless of whether there is a writer agent or one or more reader agents also accessing the immutable shared state.

7. The computer program product in accordance with claim 1, wherein the scheduling is configured to perform the following:
   allowing one or more immutable reader agents access to the immutable shared state regardless of whether there is a writer agent or one or more reader agents also accessing the immutable shared state.

8. The computer program product in accordance with claim 1, wherein the scheduler is a concurrency scheduler such that multiple of the plurality of executable agents may be scheduled to execute concurrently.

9. The computer program product in accordance with claim 1, wherein the immutable shared state is initialized upon creation of the domain.

10. The computer program product in accordance with claim 1, wherein read access to mutable share state by an agent permits the agent to copy of any portion of the mutable shared state into a local variable of the agent.

11. The computer program product in accordance with claim 1, wherein read access to mutable share state by an agent permits the agent to copy of any portion of the mutable shared state into an instance field of the agent.

12. The computer program product in accordance with claim 1, wherein read access to immutable share state by an agent permits the agent to copy of any portion of the immutable shared state into a local variable or an instance field of the agent.

13. The computer program product in accordance with claim 1, wherein write access to mutable share state by an agent permits the agent to copy a value of a local variable, an instance field, or a domain field into a memory location referenced by a domain field.

14. A method for reducing the risk of data races in a computing system, the method being implemented by a computing system having a hardware processor and comprising:
   an act of creating a domain;
   an act of initializing the domain with mutable state and immutable state;
   an act of defining a plurality of machine-executable agents within the domain, the plurality of agents being unable to access data outside of the domain, the plurality of agents including writer agents, general agents, and immutable reader agents, wherein the writer agents have read access and write access to the mutable shared state and read access to immutable shared state, wherein the general reader agents have read access to both mutable shared state and immutable shared state, and wherein the immutable reader agents have read access to only immutable shared state, such that the immutable reader agents are unable to access the mutable shared state;

an act of implementing global access rights for the mutable shared state, such that a scheduler prevents any of the general reader agents from accessing any particular portion of the mutable shared state, even when that particular portion of the mutable shared state is not being accessed by any writer agent, wherein said any writer agent is accessing another portion of the mutable shared state.

15. A method in accordance with claim 14, further comprising:

an act of scheduling the plurality of agents by performing the following:

an act of ensuring that at most one writer agent is accessing a portion of the mutable shared state at any given time;

an act of ensuring that if a writer agent is accessing the portion of the mutable shared state, that no general reader agents are also accessing the portion of the mutable shared state;

an act of allowing one or more general reader agents access to the portion of the mutable shared state if there are no writer agents also accessing the portion of the mutable shared state;

an act of allowing one or more immutable reader agents access to the immutable shared state regardless of whether there is a writer agent or one or more reader agents also accessing the immutable shared state.

16. The method in accordance with claim 14, wherein read access to mutable share state by an agent permits the agent to copy of any portion of the mutable shared state into agent state of the agent.

17. The method in accordance with claim 14, wherein read access to immutable share state by an agent permits the agent to copy of any portion of the immutable shared state into agent state of the agent.

18. The method in accordance with claim 14, wherein write access to mutable share state by an agent permits the agent to copy agent state into mutable shared state.

19. The method in accordance with claim 14, wherein write access to mutable share state by an agent permits the agent to copy state from one portion of mutable or immutable shared state in another portion of the mutable shared state.

20. A computer program product comprising one or more physical computer-readable hardware storage devices having thereon computer-executable instructions that, when executed by one or more processors of the computing system, cause the computing system to instantiate a scheduler, a concurrency scheduler that schedules a plurality of executable agents defined within a domain that has mutable shared state and immutable shared state, wherein the plurality of executable agents include:

one or more writer agents that have read access and write access to mutable shared state and read access to immutable shared state, one or more general reader agents that have read access to both mutable shared state and immutable shared state and no write access; and one or more immutable reader agents that have read access to only immutable shared state and no write access, such that the immutable reader agents are unable to access the mutable shared state wherein the concurrency scheduling ensures that for any given portion of the mutable shared state, at most one writer agent is accessing the given portion at any given time, does not allow any reader agents to access the given portion of the mutable shared state if a writer agent is accessing the given portion of the mutable shared state, and allows one or more read agents to access the given portion of the mutable shared state if a writer agent is not accessing the given portion of the shared state, wherein the concurrency scheduler allows any of the plurality of agents to access the immutable shared state independent of any of the plurality of agents accessing mutable shared state.

* * * * *